United States Patent
Davani et al.

(10) Patent No.: US 10,475,559 B1
(45) Date of Patent: Nov. 12, 2019

(54) CONTROLLING THE MORPHOLOGY IN METAL LOADED PASTE MATERIAL

(71) Applicant: Maxim Integrated Products, Inc., San Jose, CA (US)

(72) Inventors: Nazanin Davani, Los Altos, CA (US); Joseph P. Ellul, San Jose, CA (US); Uppili Sridhar, Cupertino, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 1207 days.

(21) Appl. No.: 14/034,695

(22) Filed: Sep. 24, 2013

Related U.S. Application Data

(60) Provisional application No. 61/705,397, filed on Sep. 25, 2012.

(51) Int. Cl.
    *H01F 1/01* (2006.01)

(52) U.S. Cl.
    CPC ..................................... *H01F 1/01* (2013.01)

(58) Field of Classification Search
    CPC ................ H01F 1/01; H01F 1/00–447; C01B 33/14–193
    See application file for complete search history.

(56) References Cited

U.S. PATENT DOCUMENTS

| 5,702,630 | A | 12/1997 | Sasaki et al. |
| 6,057,377 | A | 5/2000 | Sasaki et al. |
| 6,066,581 | A | 5/2000 | Vasanta |
| 8,084,133 | B2 | 12/2011 | Colton |
| 2004/0122121 | A1* | 6/2004 | Loureiro ............ B01D 39/2093 521/153 |
| 2004/0228787 | A1* | 11/2004 | Loureiro ............ B01D 39/2093 423/333 |
| 2006/0057355 | A1* | 3/2006 | Suzuki ................... B82Y 30/00 428/308.4 |
| 2009/0054555 | A1* | 2/2009 | Baldi .................... C07F 9/3808 523/202 |
| 2009/0087644 | A1* | 4/2009 | Supriya ................ H01L 23/373 428/327 |
| 2009/0311556 | A1* | 12/2009 | Ganapathiraman ... B22F 1/0018 428/800 |
| 2010/0055170 | A1* | 3/2010 | Lee ...................... A61K 9/5115 424/451 |

(Continued)

FOREIGN PATENT DOCUMENTS

WO    WO 2007077240 A2 *  7/2007

OTHER PUBLICATIONS

Aslam et al., "Silica encapsulation and magnetic properties of FePt nanoparticles," Journal of Colloid and Interface Science 290 (2005) 444-449 (Available online Jun. 2, 2005).*

(Continued)

*Primary Examiner* — Stephen E Rieth
(74) *Attorney, Agent, or Firm* — Kevin E. West; Advent, LLP

(57) ABSTRACT

A process for producing a magnetic core material is disclosed. The process includes distributing particles within a solution medium to form a colloidal solution. The process further includes modifying a surface chemistry of the particles by adding one or more additives to the colloidal solution. The process further includes gelating the colloidal solution to form the magnetic core material.

9 Claims, 2 Drawing Sheets

(56) References Cited

U.S. PATENT DOCUMENTS

Figure 1:
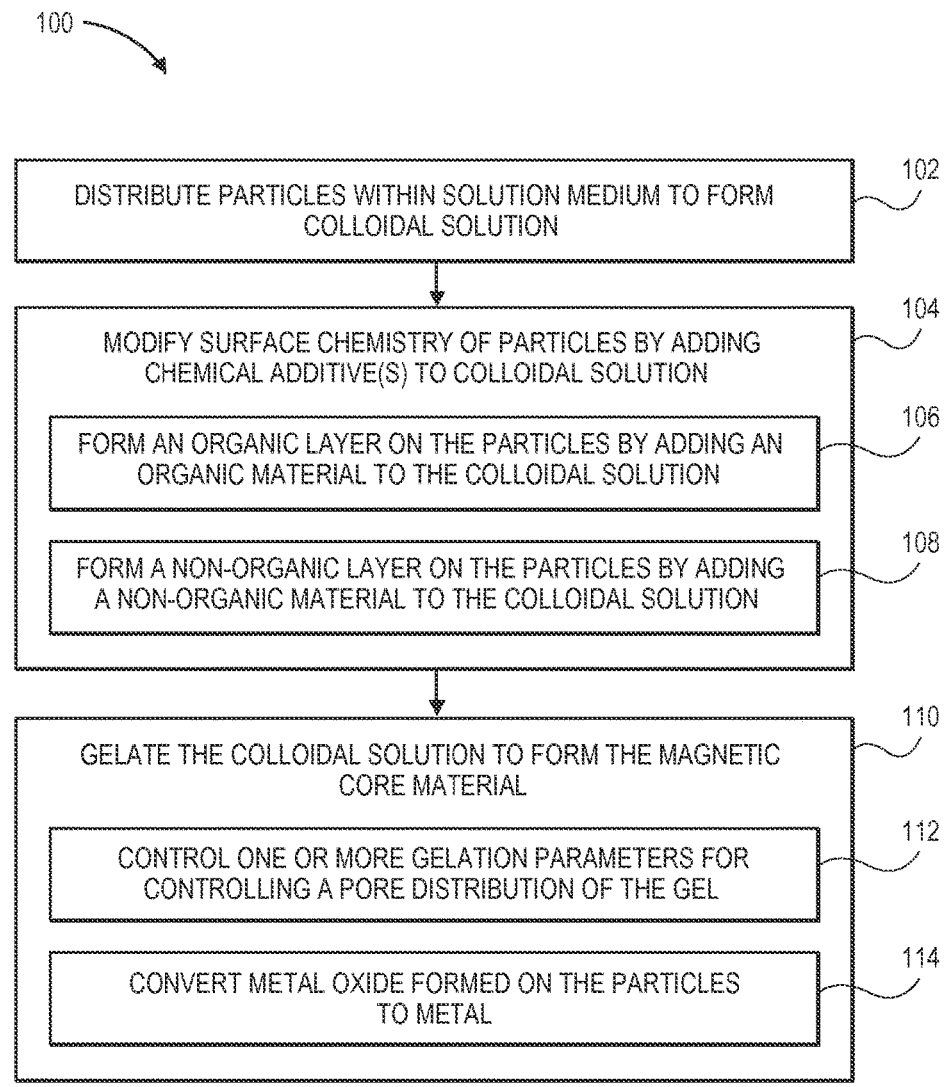

| | | | |
|---|---|---|---|
| 2010/0056360 A1* | 3/2010 | Lee | B01J 23/745 502/158 |
| 2010/0276310 A1* | 11/2010 | Chen | B82Y 30/00 206/223 |
| 2012/0043496 A1* | 2/2012 | Cabrera Perez | B01J 20/0225 252/62.54 |
| 2012/0208026 A1* | 8/2012 | Zhou | H01F 1/0054 428/404 |
| 2012/0249375 A1* | 10/2012 | Heino | C08J 3/24 343/700 MS |
| 2013/0089614 A1* | 4/2013 | Zhang | A61K 49/1833 424/489 |
| 2013/0342069 A1* | 12/2013 | Rowe | C04B 35/62807 310/216.066 |

OTHER PUBLICATIONS

Kobayashi et al., "Preparation and Properties of Silica-Coated Cobalt Nanoparticles," J. Phys. Chem. B 2003, 107, 7420-7425.*

Hawley's Condensed Chemical Dictionary, Sodium Silicate, online @ https://onlinelibrary.wiley.com/doi/10.1002/9780470114735.hawley14881 , Copyright © 2007 by John Wiley & Sons, Inc. All rights reserved. (Year: 2007).*

Stober et al., Controlled Growth of Monodispersed Silica Spheres in the Micron Size Range, Journal of Colloid and Interface Science, 26, 62-69 (1968). (Year: 1968).*

Kim et al., Magnetic Fluorescent Delivery Vehicle Using Uniform Mesoporous Silica Spheres Embedded with Monodisperse Magnetic and Semiconductor Nanocrystals, J. Am. Chem. Soc. 9 vol. 128, No. 3, 2006 688-689 (Pub. on web Dec. 31, 2005). (Year: 2005).*

Sen, R. et al. X-ray diffraction line profile analysis of nano-sized cobalt in silica matrix synthesized by sol-gel method. Journal of Alloys and Compounds, 2010, 490, 515-523. (Year: 2010).*

Membrane Science and Technology; vol. 3; 1996; pp. 23-92.

Giselher Herzer; Soft Magnetic Nanocrystalline Materials; vol. 33, Nos. 10/11; 1995; pp. 1741-1756.

M. Chatry, M. Henry, J. Livage; Synthesis of Non-Aggregated Nanometric Crystalline Zirconia Particles; vol. 29, No. 5; 1994; pp. 517-522.

Hongjian Liu, Jinghua Guo, Yadong Yin, Andreas Augustsson, Chungli Dong, Joseph Nordgren, Chinglin Chang, Paul Alivisatos, Geoff Thornton, D. Frank Ogletree, Felix G. Requejo, Frank De Groot, and Miquel Salmeron; Electronic Structure of Cobalt Nanocrystals Suspending in Liquid; Nano Letters; vol. 7, No. 7; 2007; pp. 1919-1922.

Gustavo A. Santos, Camila M.B. Santos, Sebastiao W. Da Silva, Ernesto A. Urquieta-Gonzalez, Patricia P. Confessori Sartoratto; Colloids and Surfaces A: Physiochemical and Engineering Aspects; Eng. Aspects; 395; 2012; pp. 217-224.

A. Larbot, J.P. Fabre, C. Guizard and L. Cot; Inorganic Membranes Obtained by Sol-Gel Techniques; Journal of Membrane Science; 39; 1988; pp. 203-212.

Analia I. Romero, Monica L. Parentis, Alberto C. Habert, Elio E. Gonzo; Synthesis of polyetherimide/silica hybrid membranes by the sol-gel process: influence of the reaction conditions on the membrane properties; J. Mater Sci; 2011; 46; pp. 4701-4709.

* cited by examiner

CONTROLLING THE MORPHOLOGY IN METAL LOADED PASTE MATERIAL

CROSS-REFERENCE TO RELATED APPLICATIONS

This application claims priority to U.S. Provisional Application No. 61/705,397 filed on Sep. 25, 2012, entitled: "Controlling the Morphology in Metal Loaded Paste Material", which is hereby incorporated by reference in its entirety.

BACKGROUND

An inductor (e.g., a choke, coil or reactor) is a passive two-terminal electrical component that stores energy in its magnetic field. Inductors are one of the basic components used in electronics where current and voltage change with time due to the ability of inductors to delay and reshape alternating currents. Inductors are used extensively in analog circuits and signal processing. For example, inductors can be etched directly onto a printed circuit board (PCB) or can be built on integrated circuits (ICs). An inductor is typically made of a wire (or other conductor) wound into a coil, to increase the magnetic field. The coil is wrapped around a core of either air or a ferromagnetic material. When current flowing through an inductor changes, a time-varying magnetic field is created inside the coil and a voltage is induced which opposes the change in current that created it. Inductors have resistance, due to the resistance of the wire and losses in the magnetic core material. Magnetic core material losses contribute to inductor losses at higher frequencies.

SUMMARY

A process for producing a magnetic core material is disclosed. The process includes distributing particles within a solution medium to form a colloidal solution. The process further includes modifying a surface chemistry of the particles by adding one or more additives to the colloidal solution. The process further includes gelating the colloidal solution to form the magnetic core material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

Figure 2:
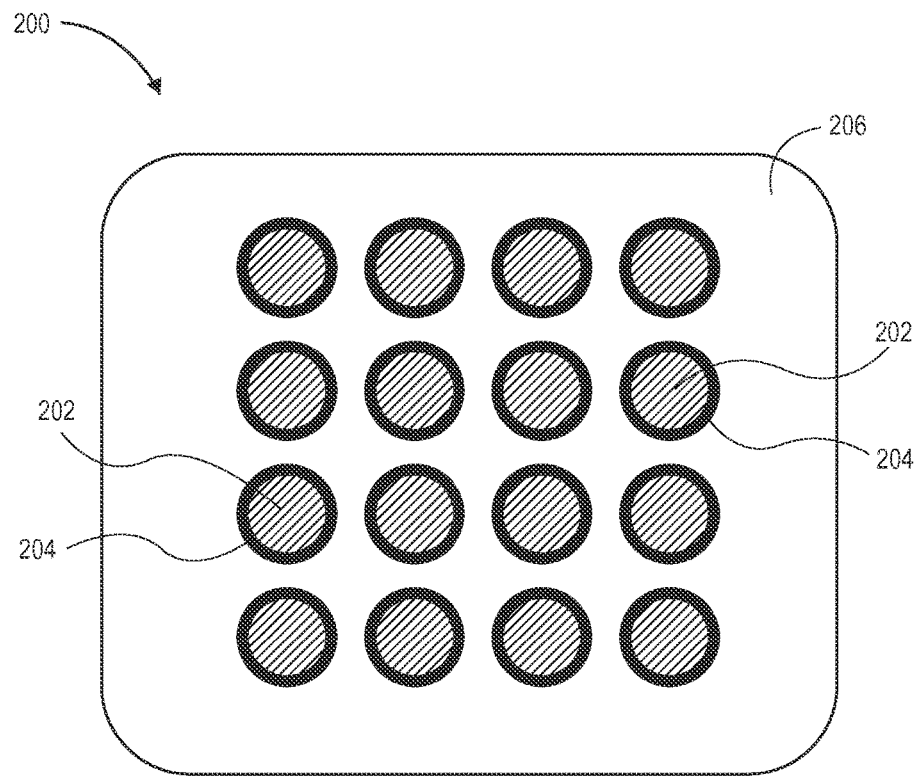

FIG. 1 is a flow chart diagram illustrating a process for producing a magnetic core material; and FIG. 2 is a conceptual block diagram illustrating a magnetic core material produced by the process depicted in FIG. 1.

DETAILED DESCRIPTION

Overview

The magnetic performance of an inductor is a direct function of its core material. For multi-component core materials, size and separation of the magnetic particles in the enclosing matrix are critical parameters affecting magnetic performance of the core materials. During production of the core materials, agglomeration or clustering of the magnetic particles, which can occur due to magnetic interaction of the magnetic particles in the matrix, can hinder magnetic performance of the core materials.

Example Processes

Referring to FIG. 1, a process for producing a magnetic core material is disclosed. In embodiments, the magnetic core material is a paste material (e.g., a gel, a magnetic paste material, a metal-loaded paste material, a metal-loaded sol-gel material). In implementations, the magnetic core material is suitable for use in power devices, such as power devices used in power management applications. In examples, the magnetic core material is suitable for use in inductors (e.g., power inductors). For instance, the magnetic core material is suitable for being screen printed for use in power inductors. In embodiments, the magnetic core material has enhanced magnetic properties which make it suitable for use in fabricated high frequency integrated or discrete inductors. For example, the magnetic core material is suitable for use in on-chip integrated or discrete inductors. In implementations, the magnetic core material is suitable for use in products which require integrated inductors operating at high frequencies and high currents. In examples, the magnetic core material provides a cost-effective, thick, inductor core material suitable for high frequency and high power applications, such as direct current-to-direct current (DC-DC) converters, power management integrated circuits (PMICs), and/or the like. In examples, the process 100 may be a sol-gel process.

In embodiments, the process 100 includes distributing particles within a solution medium to form a colloidal solution (Block 102). A colloidal solution may be defined as, but is not limited to being defined as, a solution in which a substance is microscopically dispersed throughout another substance. In implementations, the particles are magnetic particles. In examples, the particles are metal particles. For instance, the particles are formed of cobalt (Co) (e.g., are Co particles). In embodiments, the particles are magnetic nanoparticles (e.g., metal nanoparticles), such as Co nanoparticles. For instance, the magnetic nanoparticles may be defined as, but are not limited to being defined as, having diameters ranging from about 1 nanometer (nm) to about 100 nm. In implementations, the solution medium may be a non-conductive (e.g., dielectric or insulating) material. In embodiments, the solution medium forms/is configured for forming a matrix or network (e.g., a dielectric matrix, an insulating matrix, an enclosing matrix. For instance, the solution medium may be liquid glass (e.g., sodium silicate) which forms/is configured for forming a glass matrix or glass network.

In examples, the process 100 further includes modifying a surface chemistry of the particles by adding one or more additives to the colloidal solution (Block 104). For example, the additives (e.g., chemical additives) can include, but are not limited to: solvents, dispersants, binders, viscosity modifiers, passivation agents, coupling agents, fatty acids, organic materials, non-organic materials and/or carbon-based saturated chemicals. In embodiments, the chemical additives modify the surface chemistry (e.g., alter the surface energy) of the particles. Such modification affects the hydrophobicity of the particles. Depending on the degree of hydrophobicity, the particles repel adjacent particles. By affecting the particles' hydrophobicity, the additives allow for ultimate control over the particles' distribution and separation gaps. The additives act as a control factor to balance the attractive and repulsive forces between the particles, thereby providing a way to control separation of (e.g., distance between) the particles. The additives allow for precise control over separation of the particles and the interactions between the particles, which promotes preservation of particle size during production of the magnetic core material and promotes prevention of clustering or agglomeration of the particles (e.g., promotes prevention of agglomeration of the metal particles in nanoscale) during production of the magnetic core material. By preventing agglomeration of the particles, the additives promote formation of a final product (e.g., magnetic core material) which has superior magnetic properties and performance characteristics. Further, the additives, by modifying the surface chemistry of the particles, allow for control over the size of the particles and the separation between the particles. In embodiments, the additives allow for establishing and maintaining (e.g., locking in) separation between the particles at a pre-determined separation distance or within a pre-determined range of separation distances (e.g., pre-determined separation range). For instance, the particles (e.g., magnetic nanoparticles) may be established/maintained at a separation distance ranging from about 1 nanometer to about 10 nanometers. The pre-determined separation distance/range of separation distances may be selected based upon which separation distance(s) will prevent agglomeration (e.g., prevent particles from touching) and will allow for good exchange coupling between the particles. For instance, to promote good exchange coupling, the separation distance should not be too far apart (e.g., should not be greater than 10 nanometers), nor should it be too close (e.g., should not be less than 1 nanometer). In implementations, the additives allow for establishing and maintaining the particles at a pre-determined size or within a pre-determined range of sizes for promoting production of a final product (e.g., magnetic core material) having superior magnetic performance.

In embodiments, modifying the surface chemistry of the particles by adding one or more additives to the colloidal solution may include forming a non-organic layer on the particles by adding a non-organic material to the colloidal solution (Block 108). For instance, the non-organic material, after being added to the colloidal solution, may form a non-organic layer, such as a silica layer (e.g., silica coating, silica shell), on the particles. In examples, the ratio of metal-to-non-organic layer (e.g., cobalt-to-silica) of the particles may be controlled by adjusting the chemistry of the process 100. For example, chemicals which may be used to control the ratio of cobalt-to-silica layer of the particles may be tetramethoxysilane (TMOS), surfactants, such as Igepal® surfactants, and water. Other factors which may be key to controlling the morphology (e.g., size, distribution) of the particles of the magnetic core material may be chemical reaction time, heating and cooling profile, and efficient mixing of the chemicals. Controlling the thickness of the shell (e.g., the non-organic layer, silica layer) is important for promoting formation of a magnetic core material (e.g., paste) which has proper magnetic properties. For example, the thickness of the shell shouldn't be too thick or too thin, as either extreme can lead to poor exchange coupling between particles.

In implementations, modifying the surface chemistry of the particles by adding one or more additives to the colloidal solution may include, prior to adding the non-organic material to the colloidal solution, forming an organic layer on the particles by adding an organic material to the colloidal solution (Block 106). For instance, the organic material, after being added to the colloidal solution, may form an organic layer (e.g., organic coating, organic shell) on the particles. In examples in which an organic layer is implemented, the organic layer keeps the particles from agglomerating before the non-organic layer (e.g., silica shell) is formed on the particles.

In embodiments, the process 100 further includes gelating the colloidal solution to form the magnetic core material (Block 110). During gelation of the colloidal solution, the solution medium solidifies to form a gel (e.g., glass matrix, dielectric matrix, non-conductive matrix, insulating matrix, glass network) within which the particles are distributed, thereby forming the magnetic core material. During gelation, the colloidal solution may be heated to promote formation of the gel. In embodiments in which an organic layer was formed on the particles, heating temperatures of the colloidal solution may cause the organic layer to be removed from (e.g. burn off from) the particles. In examples, the non-organic layer (e.g., the silica shell) is configured to withstand the heating temperatures of the colloidal solution and remains on the particles.

In examples, gelating the colloidal solution to form the magnetic core material may include controlling one or more gelation parameters for controlling a pore distribution of the gel (e.g., gelating colloidal solution, glass network) (Step 112). In embodiments, the homogeneity and distribution of the pores in the glass network is a direct function of gelation parameters. For example, gelation parameters which can be controlled for precisely controlling the pore distribution of the glass network may include composition, pH and temperature. The pore distribution of the glass network can affect the mass transfer and capillary forces within the gel (e.g., glass network), which in turn affects the size and distribution of the particles within the gel.

In implementations, gelating the colloidal solution to form the magnetic core material may include converting metal oxide formed on the particles to metal (Step 114). For instance, during heating of the particles (e.g., cobalt particles), metal oxide (e.g., cobalt oxide) may be formed on the particles. This metal oxide (e.g., cobalt oxide) may be converted to metal (e.g., cobalt) by subjecting the particles to a reduction reaction. In implementations, converting the metal oxide formed on the particles to metal promotes proper magnetic properties of the magnetic core material.

Modifying a surface chemistry of the particles by adding one or more chemical additives to the colloidal solution (e.g., to form the silica layer on the particles) as described above, allows for the particles to be established/maintained at a pre-determined separation distance or within a pre-determined range of separation distances with respect to each other, both during and after formation of the magnetic core material. Further, modifying the surface chemistry of the particles by adding one or more chemical additives to the colloidal solution (e.g., to form the silica layer on the particles) as described above, also allows for the particles to be established/maintained at a pre-determined size or within a pre-determined range of sizes, during and after formation of the magnetic core material. In examples, the additives lock the particles in the pores of the glass matrix through chemical binding of the particles to the glass.

In embodiments, the desired characteristics (e.g., size, distribution, morphology) of the final product (e.g., the magnetic core material) and the conditions under which gelation (e.g., gel forming) occurs may dictate the composition of the additives which are added to the colloidal solution. Controlling morphology (e.g., size, distribution) of the metal nanoparticles at nanoscale in the glass network may promote super exchange coupling between the particles, which promotes high frequency characteristics of the magnetic core material for magnetic applications.

Modifying a surface chemistry of the particles by adding one or more chemical additives to the colloidal solution (e.g., to form the silica layer on the particles) as described above, allows for the particles to be established and maintained in a uniform (e.g., homogeneous) distribution within the glass matrix and to be established/maintained at a pre-determined size/within a pre-determined range of sizes during and after formation of the magnetic core material.

In implementations, to achieve the desired distribution of particles within the glass matrix, the colloidal solution (e.g., cobalt-containing colloidal solution) is kept stable during gelation. Such stability is attained from a steady state system in which static forces and surface tensions are balanced by hydrophobic repels of the particles.

In embodiments, the process 100 may implement charge stabilization along with steric stabilization. In further embodiments, chemical modifications may be made for forming an additional protective layer (e.g., on/outside of the silica shell) for promoting stabilization and for promoting realization of desired spacing between the particles.

In embodiments, an alternative process for producing a magnetic core material includes coating particles with one or more additives. In implementations, the particles are magnetic particles, such as Co nanoparticles. In examples, the one or more additives (e.g., chemical additives) modify the surface chemistry (e.g., alter the surface energy) of the particles to provide the above-described benefits (e.g., preventing particle agglomeration, clustering, etc.). In implementations, the alternative process further includes mixing the additive-treated particles with a paste material (e.g., an insulating matrix) to form the magnetic core material.

Example Implementations

Referring to FIG. 2, an exemplary magnetic core material 200 as produced by the process 100 described above is shown. The magnetic core material 200 includes the magnetic particles 202 (e.g., magnetic nanoparticles) which have been coated with the additive layer (e.g., silica layer) 204. In embodiments, such as shown in FIG. 2, the magnetic particles 202 are uniformly (e.g., homogeneously) distributed within the insulating matrix 206. In implementations, the particles 202 may be spaced apart from each other in accordance with a pre-determined separation distance or range of separation distances which is/are selected to prevent agglomeration of the particles and to promote superior exchange coupling characteristics between the particles. For instance, magnetic nanoparticles 202 may be separated from each other by a distance ranging from about 1 nanometer to about 10 nanometers. In examples, the particles 202 may be a pre-determined size or may fall within a pre-determined range of sizes which is/are selected to prevent agglomeration of the particles and to promote superior exchange coupling characteristics between the particles. By controlling the size of the particles 202, the separation between the particles 202 and the pore distribution of the gel (e.g., non-conductive/insulating matrix, glass network) 206, the process 100 described herein produces magnetic core material 200 having enhanced morphology, electromagnetic and frequency characteristics which make it suitable for use as a low cost, magnetic core material in the fabrication of high frequency integrated or discrete inductors.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A process for producing a magnetic core material, the process comprising:
    distributing particles within a solution medium to form a colloidal solution, the particles including cobalt nanoparticles, the solution medium including sodium silicate;
    modifying a hydrophobicity of the particles by forming a silica layer on a surface of the particles in the colloidal solution, the hydrophobicity of the particles controlled to establish and maintain a particle separation distance between the particles in the range of about 1 nanometer to about 10 nanometers;
    controlling a ratio of cobalt to silica of the cobalt nanoparticles and the silica layer at least by adding tetramethoxysilane, a surfactant, and water to the colloidal solution; and
    gelating the colloidal solution to form a gel, the particles and the gel forming the magnetic core material.

2. The process as claimed in claim 1, wherein the step of modifying a hydrophobicity of the particles by forming a silica layer on a surface of the particles in the colloidal solution facilitates controlling of repulsion forces between the particles.

3. The process as claimed in claim 1, wherein the step of modifying a hydrophobicity of the particles by forming a silica layer on a surface of the particles in the colloidal solution includes:
    prior to forming the silica layer on the surface of the particles, forming an organic layer on the particles by adding an organic material to the colloidal solution.

4. The process as claimed in claim 3, wherein the step of gelating the colloidal solution to form the magnetic core material includes:
    removing the organic layer from the particles.

5. The process as claimed in claim 4, wherein the organic layer is removed via heating the colloidal solution during gelation, and wherein the silica layer is retained following heating.

6. The process as claimed in claim 1, wherein the step of gelating the colloidal solution to form the magnetic core material includes:
    controlling one or more of a temperature or a pH of the colloidal solution during gelation for controlling a pore distribution of the gel.

7. The process as claimed in claim 1, wherein the step of gelating the colloidal solution to form the magnetic core material includes:
    converting a metal oxide formed on the particles to metal.

8. The process as claimed in claim 1, wherein the gel is an insulating matrix.

9. A process for producing a magnetic core material, the process comprising:
    distributing metal particles within a solution medium to form a colloidal solution, the solution medium being an insulating material, the particles including cobalt nanoparticles, the solution medium including sodium silicate;
    modifying a surface chemistry of the particles by forming a silica layer on a surface of the particles in the colloidal solution to control repulsion forces between the particles by modifying hydrophobicity of the particles, the hydrophobicity of the particles controlled to establish and maintain a particle separation distance between the particles in the range of about 1 nanometer to about 10 nanometers;

controlling a ratio of cobalt to silica of the cobalt nanoparticles and the silica layer at least by adding tetramethoxysilane, a surfactant, and water to the colloidal solution; and gelating the colloidal solution to cause the solution medium to form a gel, the gel being an insulating matrix, the particles being distributed within the gel, the particles and the gel forming the magnetic core material, wherein gelating the colloidal solution includes controlling one or more gelation parameters for controlling a pore distribution of the gel.

* * * * *